US009854390B2

(12) United States Patent
Wouhaybi et al.

(10) Patent No.: US 9,854,390 B2
(45) Date of Patent: Dec. 26, 2017

(54) CONTEXT-DRIVEN LOCAL NETWORK SERVICES

(75) Inventors: Rita H. Wouhaybi, Portland, OR (US); Tobias M. Kohlenberg, Portland, OR (US); Stanley Mo, Hillsboro, OR (US); Steven J. Birkel, Portland, OR (US); Sai P. Balasundaram, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 331 days.

(21) Appl. No.: 13/534,533

(22) Filed: Jun. 27, 2012

(65) Prior Publication Data
US 2014/0006588 A1 Jan. 2, 2014

(51) Int. Cl.
*G06F 15/177* (2006.01)
*H04W 4/02* (2009.01)
*H04W 12/08* (2009.01)
*H04L 29/12* (2006.01)
*H04L 29/08* (2006.01)

(52) U.S. Cl.
CPC ............ *H04W 4/02* (2013.01); *H04L 67/104* (2013.01); *H04L 67/1074* (2013.01); *H04L 67/1095* (2013.01); *H04L 67/1097* (2013.01); *H04W 12/08* (2013.01); *H04L 61/15* (2013.01); *H04L 67/06* (2013.01); *H04L 67/10* (2013.01); *H04L 67/16* (2013.01); *H04L 67/18* (2013.01); *H04L 67/327* (2013.01); *H04L 67/34* (2013.01)

(58) Field of Classification Search
CPC ... H04L 12/282; H04L 65/403; H04L 67/303; H04L 29/08972; H04L 67/327; H04L 67/2814; H04L 29/14; H04L 29/08738; H04N 21/44204; H04N 21/4316; H04W 8/18
USPC ........................................................ 709/224
See application file for complete search history.

(56) References Cited

U.S. PATENT DOCUMENTS 7,613,702 B2 * 11/2009 Horvitz ................. G06F 21/335
2007/0192486 A1 8/2007 Wilson et al.
(Continued)

OTHER PUBLICATIONS

International Search Report and Written Opinion for PCT Patent Application No. PCT/US2013/046022, dated Nov. 27, 2013, 11 pages.
(Continued)

*Primary Examiner* — Sm Rahman

(57) ABSTRACT

Various embodiments are generally directed to cooperation among networked devices to obtain and use a multiple-frame screenshot. In one embodiment, an apparatus comprises a processor circuit executing a sequence causing the processor circuit to receive a signal conveying a context data; retrieve an aspect of a current context of the apparatus; compare the aspect to the context data; determine whether a context defined as appropriate exists to engage in interactions with one or more other computing devices through a network based on the comparison, the interactions comprising providing a network service to the one or more other computing devices; and engage in the interactions with one or more computing devices through the network when the appropriate context to engage in the interactions exists. Other embodiments are described and claimed herein.

23 Claims, 7 Drawing Sheets

(56) References Cited

U.S. PATENT DOCUMENTS

| | | | |
|---|---|---|---|
| 2009/0049485 A1* | 2/2009 | Agrawal | H04N 7/108 |
| | | | 725/87 |
| 2009/0248476 A1 | 10/2009 | Trinh et al. | |
| 2010/0138737 A1 | 6/2010 | Olawsky et al. | |
| 2010/0284290 A1* | 11/2010 | Williams | H04W 28/0263 |
| | | | 370/252 |
| 2011/0087975 A1* | 4/2011 | Karsten | H04M 1/72586 |
| | | | 715/762 |
| 2011/0225368 A1 | 9/2011 | Burge, III | |
| 2011/0264656 A1 | 10/2011 | Dumais et al. | |
| 2011/0276396 A1 | 11/2011 | Rathod | |

OTHER PUBLICATIONS

Extended European Search Report for European Patent Application No. 13810393.2, dated Feb. 10, 2016, 10 pages.

* cited by examiner

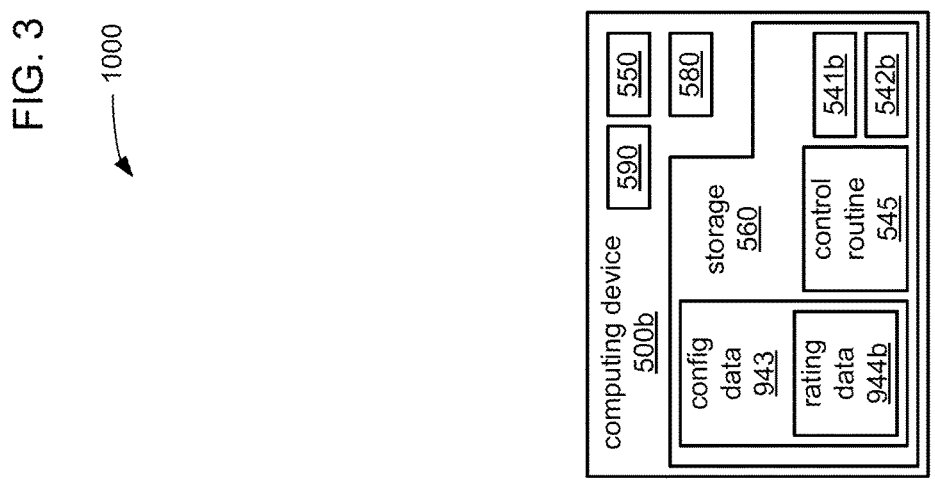
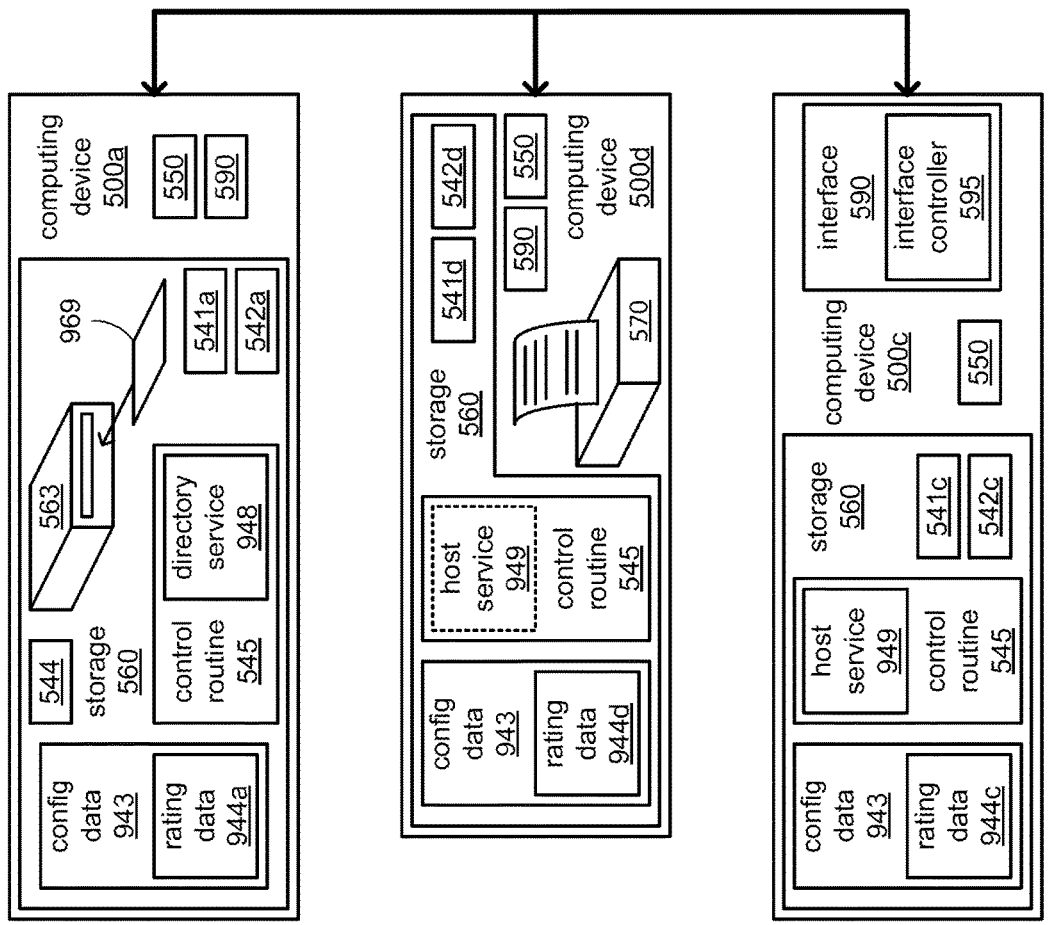
FIG. 3

CONTEXT-DRIVEN LOCAL NETWORK SERVICES

BACKGROUND

Computing devices are sufficiently pervasive in everyday social and business circles that even people who meet face-to-face often also want to use their computing devices together in various ways to exchange data and/or share resources. However, such computing devices are often designed in both their hardware and software with an intrinsic assumption that they will be employed only by one person, and that they will be employed either in a standalone manner or in a manner making use of network services provided by a distant server or bank of servers and only in a standalone manner. As a result, mechanisms for exchanging data and sharing resources among computing devices in more local proximity to each other, even computing devices that are owned and used by the same person, are often cumbersome.

By way of example, an electronic data file may be stored in one computing device, and there may be a need to share that data file with another computing device in local proximity. Currently, regardless of whether those two computing devices are associated with a common organization or even the same person, sharing the data file between them either entails the use of some form of storage media to physically carry the data file from one computing device to the other, or the use of services provided by a distantly located server or bank of servers. Where the services of a distant server or bank of servers is employed, both of the computing devices must contact the server or bank of servers through the Internet (or other long-range network), must each be authenticated as accepted computing devices by that server or bank of servers, and then employ file transfer, email or other service provided by that server or bank of servers to indirectly transfer the data file between the two computing devices. Unfortunately, the use of a storage media may be thwarted by the storage media not being available when needed and/or by the storage media not being operable with one or both of the computing devices. Similarly, the use of one or more distantly located servers may be thwarted by a lack of available access to the Internet or other long-range network by which the distantly located server or servers may be reached. Further, even if nothing prevents both computing devices from reaching the one or more distantly located servers, such use of such long-range electronic communications to transfer a data file between two computing devices that are in relatively close proximity to each other is not efficient and may not be cost effective.

It is with respect to these and other considerations that the techniques described herein to form and maintain a local ad hoc network are needed.

BRIEF DESCRIPTION OF THE DRAWINGS

FIG. 3 illustrates an embodiment of third interactions among computing devices.

DETAILED DESCRIPTION

Figure 1:
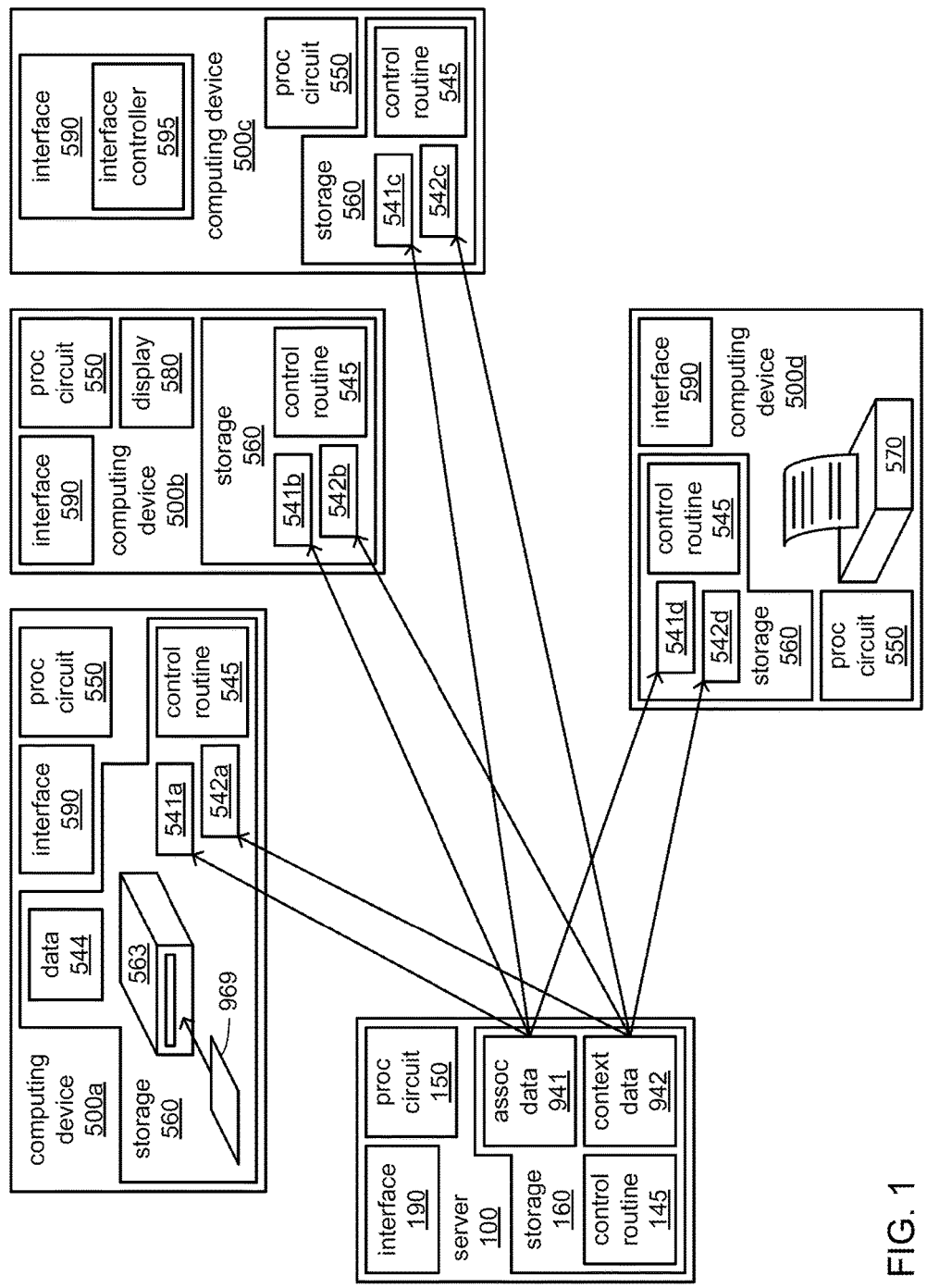
FIG. 1 illustrates an embodiment of first interactions among computing devices.

Various embodiments are generally directed to use of contextual information concerning people, places and/or events to control provision and use of network services on a local network. Some embodiments are particularly directed to the provision and use of network services among computing devices brought into local proximity.

More specifically, multiple computing devices are caused by a combination of association data (e.g., data indicative of a person and/or group associated with a computing device, data concerning other relationships between people, etc.), context data (e.g., data concerning a person's interests, an event schedule, places where people meet, etc.), and/or configuration data (e.g., data indicating past configurations of resource allocation and service provision among computing devices that have occurred in the past, and ratings of those past configurations) to automatically interact with each other, again, in a similar manner. In such a new interaction, resources are again shared and allocated, and services are again provided and used among those multiple computing devices to enable exchanges of data and/or use of resources shared by each.

The association data and/or the context data may be provided to each of the computing devices from a server or servers of a common organization with which the computing devices and the server or server(s) are all associated (e.g., association data indicating that the association of all of the computing devices with that organization, and context data indicating meetings or other events that persons of that organization are scheduled to attend). However, one or both of the association data and the context data stored within one or more of the computing devices may be created independently of any such server or servers (e.g., lists of other persons that users of one or more of the computing devices associates with and creates themselves, and a schedule of activities that users of one or more of the computing devices maintains themselves).

As part of the allocation of resources and initial provision of services, the configuration data is distributed among the computing devices, and where possible, redundant provisioning of services is arranged to enable the continued sharing of resources and/or provision of services following an instance of one of the computing devices falling out of contact and/or instance of a new computing device being added. Such sharing of resources and provision of services among the computing devices may take place over any type of network or linked multitude of networks based on any of a variety of cabling-based and/or wireless technologies. Further, whatever network or networks are used may have already been in placed and joined by the computing devices prior to their sharing resources and/or providing services, or the computing devices may form a network among themselves for the purpose of sharing resources and/or providing services.

An advantage of computing devices sharing resources and providing services in a manner not entailing the use of distantly located servers is that the need to obtain and maintain access to the Internet and/or other long-range networks to reach distantly located servers is avoided. Thus, such local interaction among computing devices may occur in locations that are devoid of such infrastructure support, e.g., in locations in which no access is provided to the Internet and/or other such long-range networks. Another advantage is that the need for users of such computing devices to remember to bring some form of storage media or to make sure that the storage media they bring is operable with all of the computing devices brought by others of the users is avoided.

In one embodiment, for example, an apparatus comprises a processor circuit and a storage communicatively coupled to the processor circuit and storing a sequence of instructions that when executed by the processor circuit, causes the processor circuit to: receive a signal conveying a context data; retrieve an aspect of a current context of the apparatus; compare the aspect to the context data; determine whether a context defined as appropriate exists to engage in interactions with one or more other computing devices through a network based on the comparison, the interactions comprising providing a network service to the one or more other computing devices; and engage in the interactions with one or more computing devices through the network when the appropriate context to engage in the interactions exists. Other embodiments are described and claimed herein.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may comprise a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
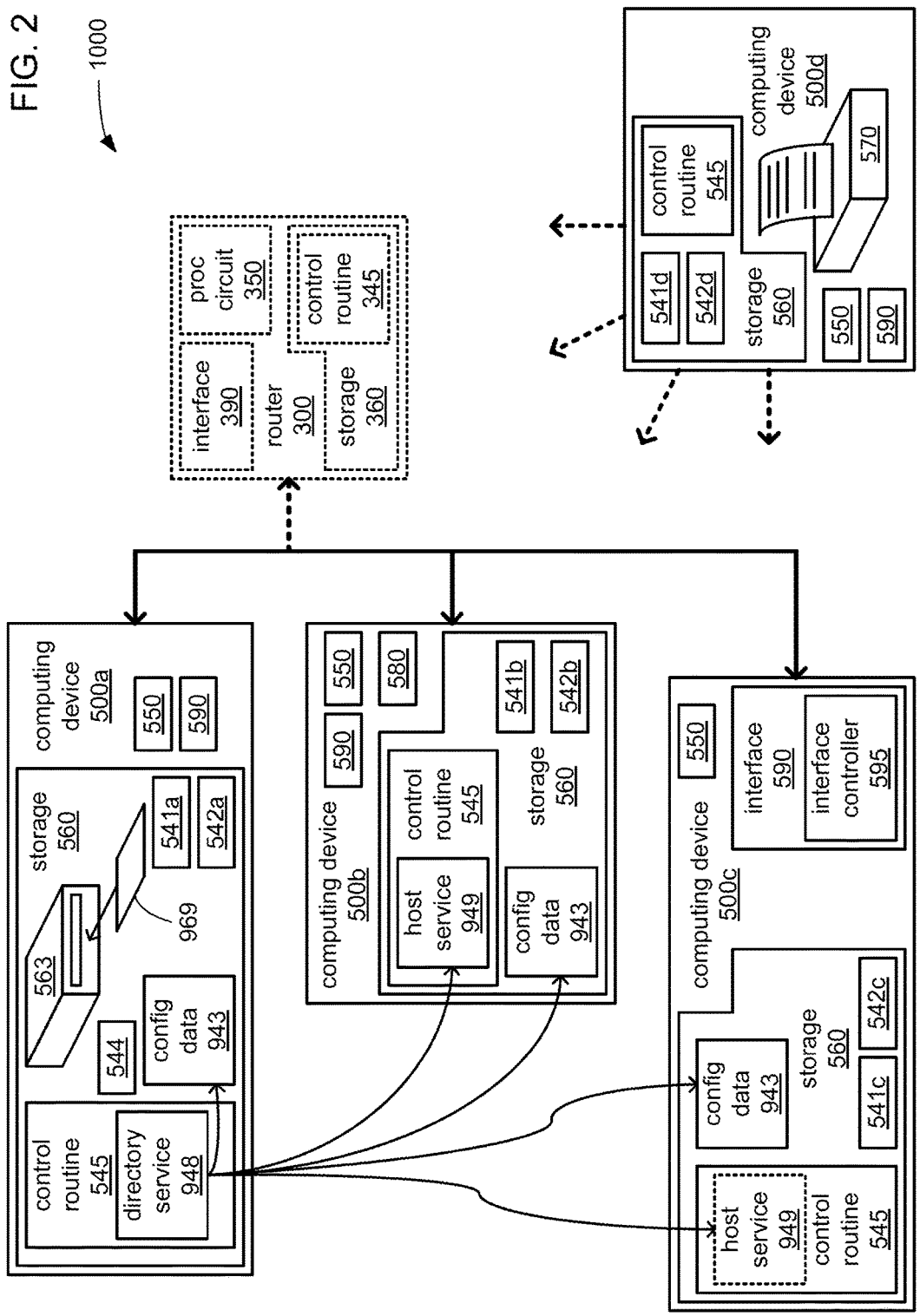
FIG. 2 illustrates an embodiment of second interactions among computing devices.

FIG. 1 illustrates a block diagram of transfers of data among computing devices, specifically from a server 100 to each of computing devices 500a-d, in preparation for subsequent sharing of resources and provision of services among the computing devices 500a-d (as illustrated in FIG. 2 and FIG. 3). Each of the computing devices 500a-d may be any of a variety of types of computing device, including without limitation, a desktop computer system, a data entry terminal, a laptop computer, a netbook computer, a tablet computer, a handheld personal data assistant, a smartphone, a body-worn computing device incorporated into clothing, a computing device integrated into a vehicle, etc. The server 100 may be any of a variety of types of computing device employed as a server (or possibly, a bank of either co-located or geographically dispersed computing devices employed as servers) associated with an organization such as a corporation or government department, and supporting the storage and/or exchange of information among persons associated with that organization (e.g., employees, members, customers, etc. of that organization). Each of the computing devices 500a-d is associated with a person associated with the organization with which the server 100 is also associated.

In various embodiments, the server 100 comprises a storage 160 storing at least a control routine 145, an association data 941 and a context data 942; a processor circuit 150; and an interface 190. In executing a sequence of instructions of at least the control routine 145, the processor circuit 150 is caused to operate the interface 190 to transmit the individualized versions of the association data 941 and the context data 942 to each of the computing devices 500a-d. These transfers of data to each of the computing devices 500a-d may each occur at different times through different combinations of wired or wireless network, and may or may not occur through the Internet or an entirely private coupling to the server 100.

In various embodiments, each of the computing devices 500a-d comprises a storage 560 storing at least a control routine 545, a corresponding one of an association data 541a-d, and a corresponding one of a context data 542a-d; a processor circuit 550; and an interface 590. In executing a sequence of instructions of at least the control routine 545, the processor circuit 550 in each of the computing devices 500a-d is caused to operate the interface 590 to receive the individualized versions of the association data 941 transmitted by the server 100 to each of computing devices 500a-d, and is caused to store corresponding ones of the individualized versions as the association data 541a-d, respectively, in corresponding ones of the storage 560. Similarly, the processor circuit 550 in each of the computing devices 500a-d is also caused to operate the interface 590 to receive the individualized versions of the context data 942 transmitted by the server 100 to each of the computing devices 500a-d, and is caused to store corresponding ones of the individualized versions as the context data 542a-d, respectively, in corresponding ones of the storage 560.

The individualized versions of association data 541a-d each define what other computing devices are accepted computing devices with which automatic interaction to share resources and/or provide network services is deemed permissible and/or desirable, this data including without limitation, whitelists and/or blacklists of computing devices or of persons and/or organizations associated with computing devices, a password that other computing devices must provide to be accepted, etc. Further, each one of the association data 541a-d may include a unique identifier associated with a corresponding one of each of the computing devices 500a-d. The unique identifier given in the association data to one of these computing devices enables it to be matched in a list of accepted computing devices included in the association data given to another of these computing devices, thereby enabling the one to be recognized by the other as an accepted computing device. These unique identifiers may be caused by the control routine 145 to be randomly generated by the processor circuit 150 of the server 100 for each of the computing devices 500a-d, or may be based on another identifier already given to each of the computing devices 500a-d (e.g., a MAC network identification number associated with and unique to each interface 590 of each of the computing devices 500a-d).

The individualized versions of context data define appropriate contexts (e.g., who, where and/or when) to enable each of the computing devices to determine when in sharing resources and/or providing/using network services, this data including without limitation, meeting schedules, social event schedules, hobbies and/or other interests of one or more people, nature of an association with another person, places of particular interest to one or more persons, places deemed desirable at particular times as locations in which to form local networks, etc.

At later times, in response to the contents of their individual ones of the association data 541a-d and their individual ones of the context data 542a-d, the processor circuits 550 of corresponding ones of the computing devices 500a-d are caused by corresponding ones of the control routines 545 to operate corresponding ones of the interfaces 590 to automatically identify each other as accepted computing devices, thereby enabling them to share resources and provide network services to each other without further involvement of the server 100.

It should be noted that despite this depiction and discussion of each of the computing devices 500a-d being provided with association and context data, in various embodiments, association and/or context data may be created and/or augmented within one or more of the computing devices 500a-d by actions of persons associated with one or more of these computing devices. For example, context data in the form of a calendar of upcoming activities may be manually entered by a person associated with one of the computing devices 500a-d, along with information concerning what other persons with which they will be conducting those activities, thereby defining a context of when and with which person's computing device to automatically interact with. By way of another example, association data in the form of a contacts list of other persons may be manually entered by a person associated with one of the computing devices, thereby possibly enabling identification of computing devices associated with those other persons to be deemed acceptable computing devices with which to automatically interact. Such manually-provided association and/or context data may be employed in lieu of any that may be received from a server (e.g., the server 100) or may be employed in combination with such server-provided data.

Despite many similarities in the depicted computing devices 500a-d, there are differences among them. Either the storage 560 of the computing device 500a comprises a removable media storage 563 structured to employ machine-readable storage media 969, or the computing device 500a is capable of being communicatively coupled to the removable media storage 563, thereby enabling the machine-readable storage media 969 to be employed to exchange data between the computing device 500a and other computing devices. Further, the computing device 500a has stored within its storage 560 a piece of data 544 that is not stored in any of the other computing devices 500a or 500c-d. The computing device 500b either comprises or is capable of being communicatively coupled to a display 580. The interface 590 of the of the computing device 500c comprises an interface controller 595 operable by the processor circuit 550 of the computing device 500c to access a cellular wireless network that provides access to the Internet. The computing device 500d either comprises or is capable of being communicatively coupled to a printer 570.

In various embodiments, each of the processor circuits 150 and 550 (of each of the computing devices 500a-d) may comprise any of a wide variety of commercially available processors, including without limitation, an AMD® Athlon®, Duron® or Opteron® processor; an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of the processor circuits 150, 350, 550 and 750 may comprise a multi-core processor (whether the multiple cores coexist on the same or separate dies), and/or a multi-processor architecture of some other variety by which multiple physically separate processors are in some way linked.

In various embodiments, each of the storages 160 and 560 (of each of the computing devices 500a-d) may be based on any of wide variety of information storage technologies, possibly including volatile technologies requiring the uninterrupted provision of electric power, and possibly including technologies entailing the use of machine-readable storage media that may be removable (e.g., the removable media storage 563 of the storage 560 of the computing device 500a), or that may not be removable. Thus, each of these storages may comprise any of a wide variety of types of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of the storages 160 and 560 are depicted as a single block, one or more of these may comprise multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM).

In various embodiments, one or more of the control routines 145 and 545 (of each of the computing devices 500a-d) may comprise an operating system that may be any of a variety of available operating systems appropriate for whatever corresponding ones of the processor circuits 150 and 550 comprise, including without limitation, Windows™, OS X™, Linux®, or Android OS™.

In various embodiments, each of the interfaces 190 and 590 (of each of the computing devices 500*a-d*) may employ any of a wide variety of signaling technologies enabling each of devices 100 and 500*a-d* to be communicatively coupled to other devices, including other computing devices. Each of these interfaces comprises circuitry providing at least some of the requisite functionality to enable access to other devices, either via direct coupling or through one or more networks (e.g., the network 1000). However, each of these interfaces may also be at least partially implemented with sequences of instructions executed by corresponding ones of the processor circuits 150 and 550 (e.g., to implement a protocol stack or other features). Where electrically and/or optically conductive cabling is employed in coupling to other devices, corresponding ones of the interfaces 190 and 590 may employ signaling and/or protocols conforming to any of a variety of industry standards, including without limitation, RS-232C, RS-422, USB, Ethernet (IEEE-802.3) or IEEE-1394. Alternatively or additionally, where wireless signal transmission is employed in coupling to other devices, corresponding ones of the interfaces 190 and 590 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190 and 590 are depicted as a single block, one or more of these may comprise multiple interfaces (one or more of which possibly having a distinct interface controller, such as the interface controller 595 of the interface 590 of the computing device 500*c*) that may be based on differing signaling technologies.

Additionally, in various embodiments, as part of enabling communications with other devices, the interface 590 of one or more of the computing devices 500*a-d* may enable at least the receipt of signals from cellular wireless networks, area wireless networks, and/or a global positioning satellite (GPS) system to enable the processor circuit 550 of such ones of these computing devices to determine their geographic location (to at least some degree). In addition to receiving signals providing such geographic information, such wireless signals (especially those of area wireless networks typically found in urban areas) may provide some indication of what is located in a given area (e.g., schools, hospitals, shopping, museums, stadiums, etc.).

FIG. 2 illustrates a block diagram of interactions among computing devices through a network 1000, possibly making use of preparations illustrated in FIG. 1. In these interactions, as will be explained in greater detail, various ones of the computing devices 500*a-d* share resources, provide network services and/or use network services provided by one or more of the others of these computing devices. As previously discussed, such interactions between the computing devices 500*a-d* may take place over any of a variety of networks either joined into by one or more of the computing devices 500*a-d*, or formed among one or more of the computing devices 500*a-d* specifically to enable such interactions. Thus, the network 1000, being of any of a variety of types of network, may or may not include and employ at least some network infrastructure support provided by a router 300. The router 300 may be any of a variety of types of network switch, hub, concentrator, managed or un-managed router, gateway and/or firewall device structured to enable coupling of computing devices in local proximity to the router 300 to other computing devices, whether local or located remotely at a considerable distance away. The router 300 may or may not be in some way associated with the organization with which the server 100 and the computing devices 500*a-d* are associated.

In various embodiments, the router 300 (if present) comprises a storage 360 storing at least a control routine 345, a processor circuit 350, and an interface 390. In executing a sequence of instructions of at least the control routine 345, the processor circuit 350 is caused to operate the interface 390 to create and maintain network connections with other computing devices (e.g., to the computing devices 500*a-d*) to form and maintain a network (e.g., the network 1000), and to enable those other computing devices to communicate with each other. The router 300 may also enable communications between those computing devices and still other more distantly located computing devices through a connection of the router 300 to the Internet and/or other long-range network(s).

Like the server 100 and the computing devices 500*a-d*, the router 300 (if present) may be yet another computing device, and in a manner that parallels those other computing devices, various ones of the components of the router 300 corresponding to components of those other computing devices may each be based on any of a wide variety of technologies. Thus, the processor circuit 350 may be any of a wide variety of commercially available processors; the storage 360 may be based on any of a variety (or any combination) of volatile and non-volatile storage technologies, perhaps employing machine-readable storage media; and the interface 390 may employ any of a variety (or any combination) of signaling technologies appropriate for any of a variety (or any combination) of cabling-based or wireless communications technologies.

As depicted in FIG. 2, the computing devices 500*a-c* are coupled to each other through the network 1000. As previously discussed, the network 1000 may have already been previously formed and the computing device 500*a-c* may have each joined the network 1000, or the network 1000 may be formed among the computing devices 500*a-c*, themselves, for the purpose of interacting to share resources, provide network services to each other and/or use network services provided by one another. Regardless of the exact manner in which each of the computing devices 500*a-c* becomes part of the network 1000, the processor 550 of each of the computing devices 500*a-c* is caused by execution of corresponding ones of the control program 545 to recurringly compare aspects of their current context of time, geographic location, proximity to other computing devices, etc. to the contents of corresponding ones of the context data 542*a-c*. From this comparison, the processor 550 of each of the computing devices 500*a-c* independently determines whether a context defined in corresponding ones of the context data 542*a-c* as an appropriate context for engaging in such interactions now exists, thus triggering such interactions. Further, each of these processor circuits may additionally compare signals conveying identifiers from other computing devices in local proximity (e.g., others of the computing devices 500*a-c*) to the contents of corresponding ones of the association data 541*a-c*. From this comparison, the processor 550 of each of the computing devices 500*a-c* may independently determine whether one or more of the computing devices in local proximity are accepted computing devices with which to engage in such interactions.

In various embodiments, one or more of the context data 542*a-c* comprises data concerning events that persons associated with one or more of the computing devices 500*a-c* are scheduled to participate in (e.g., meetings, barber shop appointments, ball games, etc.). In such embodiments, a recurring evaluation of whether an appropriate context to trigger interactions with other computing devices exists at least partly includes monitoring the current time to determine whether at least a chronological component of an appropriate context exists. Thus, a context defined as appropriate to trigger sharing resources and exchanging provision of network services with other computing devices may be at least partly based on whether the current contextual aspect of time has progressed such that the time of the scheduled event has arrived. Also in various embodiments, one or more of the context data 542*a-c* comprises data concerning locations of interest to persons associated with one or more of the computing devices 500*a-c*, given their hobbies, projects, or other items of interest to them. In such embodiments, a recurring evaluation of whether an appropriate context to trigger interactions with other computing devices exists at least partly includes monitoring the current location to determine whether at least a geographic component of an appropriate context exists. Thus, a context defined as appropriate to trigger sharing resources and exchanging provision of network services with other computing devices may be at least partly based on whether the current contextual aspect of location has changed such that a location of interest has been reached.

In one example embodiment, the server 100 and each of the computing devices 500*a-d* are associated with a corporation, the computing devices 500*a-d* each being owned by that corporation and individually assigned to different employees. While these employees are at work the corporation's facilities, each of the computing devices 500*a-d* are able to be communicatively coupled to the server 100 to receive their individualized versions of association and context data, as previously described in regard to FIG. 1. The association data 941 and 541*a-d* may comprise lists of employees matched to the identifiers for their assigned computing devices, perhaps along with indications of the manner in which the employees are organized into departments, divisions and/or projects. The context data 942 and 542*a-d* may comprise meeting schedules, including indications of locations, subjects, associations with particular projects, level of importance, etc.

Continuing in this one example, a meeting has been scheduled to occur at a location away from corporate facilities (e.g., a lunchtime meeting at a sandwich shop) among the employees to whom the computing devices 500*a-c* have been assigned, but which does not involve the employee to whom the computing device 500*d* has been assigned. As a result, the context data 541*a-c* stored in the storage 560 of each of the computing devices 500*a-c* includes details concerning this meeting that define the meeting as an appropriate context in which to engage in interaction among computing devices, but not the context data 541*d* in the storage 560 of the computing device 500*d*, given that the employee associated with the computing device 500*d* need not be given details of a meeting they are not scheduled to attend.

Continuing in this one example, as the time of the meeting approaches and each of the employees associated with the computing devices 500*a-c* bring their computing devices to the sandwich shop, the processor 550 of each of these computing devices is triggered to engage in interactions with the others of these particular computing devices, enabling the sharing of resources and/or provision of network services to one another. Thus a combination of an event-based context and a corporate-maintained list of accepted computing devices both triggers and controls the interactions of these computing devices in support of the meeting among the persons associated with them. All three of the persons associated with the computing devices 500*a-c* are able to access data stored on the machine-readable storage media 969, view slides of the meeting on the display 580 (which may be a projector or particularly easy-to-view display that the person associated with the computing device 500*b* brought along), etc.

Geographic location and/or relative proximity of one or more of the computing devices 500*a-c* may also be included in defining what is deemed an appropriate context to triggering such interactions among the computing devices 500*a-c*. Specifically, one or more of the computing devices 500*a-c* in which the interface 590 supports the receipt of GPS signals may include being at the sandwich shop as a further condition of determining that the context is appropriate to trigger interactions with others of the computing devices 500*a-c*. Alternatively or additionally, the processor 550 of one or more of the computing devices 500*a-c* may employ any of a variety of techniques to determine the proximity of others of the computing devices 500*a-c* (e.g., signal strength, identity of network devices providing network infrastructure to which each computing device is coupled, etc.), and may include a defined degree of proximity to others of the computing devices 500*a-c* as a further condition of determining that the context is appropriate to trigger interactions with one or more of the others of the computing device 500*a-c*. The inclusion of proximity as an additional condition may be based on an assumption that only those persons who have brought their computing devices into relatively close proximity are actually attending the meeting, whereas others who may be somewhat more distant (even though still arguably in local proximity) are more likely involved in other activities.

In another example embodiment, the server 100 is associated with a website of a social networking organization accessible via the World Wide Web through the Internet through which people are able to be introduced and on which groups of people engaged in activities may maintain a "presence" on the Internet by which they are able to coordinate activities. In this example, each of the computing devices 500*a-d* are used by persons who are users of the website, with these users occasionally accessing the server 100 on which this website is based to obtain information concerning members of a group of which they are members, upcoming events and/or suggested places to visit at which activities aligned with the common interests of persons in that group may be conducted. While employing their various ones of the computing devices 500*a-d* to access the website supported by the server 100, each of the computing devices 500*a-d* receives versions of association data 541*a-d* and context data 542*a-d*, respectively, that may be personalized based on what individual ones of these members have given in the way of information to the website (e.g., home addresses, their ages, specific activities of interest, etc.).

Continuing in this example, the group is an outdoor activities group where the website recommends places to go for hiking, camping, etc. Each of the users of the computing devices 500*a-d* has independently (with no coordination among them) decided to visit a particular state park on the same day. The association data 541*a-d* comprises a list of accepted computing devices and the members with which each of those computing devices is associated that includes all four of these users and their computing devices 500*a-d*, and the context data 542*a-d* comprises a list of places of interest for hiking, camping, etc., including the state park that each of these users has decided to visit.

Continuing in this example, as each of these four users reaches the state park, each bringing their computing devices to the state park, the processor 550 of each of these computing devices is triggered to attempt to locate computing devices associated with other members of the group as a result of having detected (perhaps by via receiving GPS signals) the current geographic location as being this particular state park. Upon detecting one or more of the other computing devices 500*a-d*, and confirming that they are accepted computing devices (in this example, associated with the same group), interactions between them take place in which resources are shared and/or network services are provided. In other words, it is the context of arriving at a location of interest to a person associated with a given computing device that triggers interactions with other accepted computing devices.

Just as geographic location was used in defining the appropriate context in this example of group members coming to a state park, proximity between computing devices may also be used. Specifically, detecting another computing device that isn't just an accepted computing device associated with the same group and inside the same state park, but is also within a defined distance may serve as the defined appropriate context that triggers such interactions between those computing devices. Similar to the earlier example of employees of a corporation meeting at a sandwich shop, there may be a presumption that only persons within the defined distance are likely to actually be interacting with each other, and that those persons not within that defined distance may not be interested in interacting with the other persons, despite being members of the same group with the same interests in the same state park.

Still further examples are possible in which triggering of interaction involving sharing of resources and/or provision network services is based on other possible combinations of various context criteria, as limited by association. Other possible associations between persons include, without limitation, family connections, temporary associations based on being fellow passengers on a cruise, etc. Other contexts dictating whether or not such interactions are automatically triggered include, without limitation, a range of times in a day and/or specified days of a week in which a person may or may not want their computing device to participate in such interactions, or a multitude of specific activities that may trigger such interactions regardless of when they take place. As one such further example, two spouses may have computing devices that they desire to have communicate with each other at times and in places where neither of them are at work so as to avoid distracting each other during work hours or work-related events outside work hours. Thus, the association data of each of their computing devices specifies each other's computing devices as acceptable computing devices with which to engage in such interactions, while the context data of each device includes work hours and scheduled work-related events (whether during work hours or outside work hours) as defining times during which the context is not appropriate to form a network. Thus, in this example, scheduled work-related events are employed as indicative against the context being appropriate to form a network.

Yet further examples are possible in which activity associated with one or more data files, program files and/or resources of a particular computing device may be defined as an appropriate context in which that particular computing device is triggered to engage in interactions with computing devices of others having some association with the activity, regardless of schedule. As one such further example, a computing device associated with someone who plays video games may monitor a piece of stored executable instructions of a video game for an indication of those instructions being executed as a result of that person playing the video game as a trigger to seek and interact with other computing devices that may be in local vicinity on which the same video game is also being played to automatically enable a group experience among nearby players associated with those computing devices. As another of such further examples, a document associated with a project associated with particular persons may be stored on a particular computing device, and may be monitored that document for an indication of that document being accessed by the person associated with that computing device as a trigger to seek and interact with other computing devices associated with any of the other persons associated with that document, and perhaps limited to only to the ones of those persons who are in local vicinity.

Additionally, beyond such interactions between computing devices being automatically triggered as a result of a context defined as an appropriate context for such interactions coming into existence, provision may be made in one or more of the computing devices 500*a-c* for such interactions to be triggered, manually. More precisely, each of the processors 550 of the computing devices 500*a-c* may be caused to recurringly monitor one or more manually-operable controls (not shown) of these computing devices for indications of being operated to manually trigger such interactions, resulting in the processor(s) 550 being caused to operate respective ones of their interfaces 590 to effect such interactions. It may be that although an appropriate context for triggering such interactions automatically is about to come into existence, one or more of the persons associated with these computing devices may desire to preemptively trigger it.

Returning more generally to FIG. 2, regardless of the exact manner in which the communications devices 500*a-c* came to be part of the network 1000 (i.e., whether they joined the network 1000 after it had been previously formed, or they formed the network 1000, themselves), and regardless of the exact nature of the defined context that triggered interaction among the communications device 500*a-c*, a first assignment of a network service, namely a directory service 948, is performed. More precisely, one of the computing devices 500*a-c* is selected to provide directory service 948 to coordinate allocation of resources and requests for resources among the computing devices 500*a-c* through the network 1000. In some embodiments, the persons associated with each of the computing devices 500*a-c* (e.g., the users of each of the computing devices 500*a-c*) are provided with an opportunity to manually select which of these computing devices provides the directory service 948, while in other embodiments, any of a number of algorithms may be employed by the processor circuit(s) 550 of one or more of these computing devices to select one of the computing devices 500*a-c* to provide the directory service 948, automatically.

With one of the computing devices 500*a-c* selected to provide the directory service 948, the processor circuits 550 of the others of the computing devices 500*a-c* are caused to transmit signals across the network 1000 that are indicative of resources that each are able to make available and/or indicative of resources that each may be seeking to whichever one of the computing devices 500a-c is assigned to provide the directory service 948. Examples of such resources include, without limitation, the removable media storage 563 of the computing device 500a, the display of the computing device 500b, the cellular wireless access to the Internet of the interface controller 595 of the computing device 500c, the printer 570 of the computing device 500d, a predetermined portion of processor time of the processor circuit 550 of one or more of the computing devices 500a-d, an amount of storage space within the storage 560 of one or more of the computing devices 500a-d, etc. However, as will be familiar to those skilled in the art, what a computing device makes available in the way of resources for use by other computing devices may be less than the resources it actually has. This may be a result of a user of that computing device configuring that computing device to make available only certain resources for being shared with other computing devices.

Upon receiving the transmitted signals indicating what resources the others of the computing devices are able to make available, and similarly taking into account what resources it is able to make available itself, the processor circuit 550 of whichever one of the computing devices 500a-c is providing the directory service 948 allocates what functions are provided by each of the computing devices 500a-c, at least to handle any requests received for network services. In so doing, the processor circuit 550 is caused to assign one of the computing devices 500a-c to provide another network service, namely a host service 949 in which that one of the computing devices 500a-c recurring tracks the presence of each of the other computing devices involved in the interactions among the computing devices 500a-c, and relays requests to update the allocation of resources to whichever one of the computing devices 500a-c provides the directory service. As those skilled in the art will readily recognize, the selection of a computing device to provide the host service 949 may be carried out employing any of a number of algorithms, including algorithms taking into account available processor and/or storage resources of each computing device, and perhaps favoring the selection of a computing device with greater processor and/or storage resources able to be made available through a network.

As specifically depicted as an example in FIG. 2, the computing device 500a is selected to provide a directory service 948 implemented by its processor circuit 550 under the control of its control routine 545. Upon being signaled by the computing devices 500b and 500c with indications of what resources each was able to make available and what resources each is requesting, and taking into account what resources it was able to make available and what resources it needs, the processor 550 of the computing device 500a creates, and then both stores (in its storage 560) and transmits (via its interface 590) copies of a configuration data 943 describing the allocation of resources and provision of network services to each of the computing devices 500b and 500c. In turn, the processor circuits 550 of each of the computing devices 500b-c operate their respective interfaces 590 to receive the configuration data 943, and then store the configuration data 943 in their respective storages 560. More specifically, among what is described in the configuration data 943 is which ones of the computing devices 500a-c are to provide the primary and backup host services 949. As depicted, the computing device 500b is selected to provide the host service 949 and the computing device 500c is selected to be ready to provide its backup (as indicated with dotted lines). The configuration data 943 also describes which of the computing devices 500a-c is to provide what resources to the others. As depicted, the computing device 500a may make available access to the removable media storage 563 (enabling the computing devices 500b-c to access the contents of any machine-readable storage media 969 currently accessible to the removable media storage 563); the computing device 500a may also make available a portion of its storage 560 (thereby possibly enabling the data 544 to be shared with the computing devices 500a and 500c); the computing device 500b may make available access to its display 580; and the computing device 500c may make available its wireless cellular access to the Internet via the interface controller 595.

Beyond the assignment of provision of directory service 948 and the host service 949 to one or more of the computing devices 500a-c, other network services may be requested by one or more of these computing devices, and thus, may be assigned to be provided by one or more of these computing devices. Such other possible services include, without limitation, file transfer, email relay, web hosting, instant messaging, telnet relay, etc. Thus, various network services often provided by distantly located servers may be provided locally (perhaps, entirely within the network 1000) by one or more of the computing devices 500a-c, themselves, without involvement of any such distant assistance.

In maintaining the network 1000, the processor circuit 550 of the computing device 500b, as a result of being assigned to provide the host service 949, is caused by its control routine 545 to recurringly operate its interface 590 to signal each of the other computing devices 500a and 500c with what is known as a "ping" signal conveying a request for a response to confirm the continued presence of each as part of the network 1000. This is done to at least detect an instance of one or both of the computing device 500a or 500c dropping out of the network 1000, though this may also be done as a test of signal quality in communicating with each.

The processor 550 of the computing device 500b also recurringly operates its interface 590 to monitor the network 1000 for indications of another computing device deemed to be an accepted computing device being added. As further illustrated in FIG. 2, with the computing devices 500a-c already interacting with each other in the manner that has been described at length, a person associated with the computing device 500d has brought this one computing device into the network 1000 such that it could conceivably join in such interactions.

Where the contents of at least the association data 541d and the context data 542d make it appropriate for the computing device 500d to be automatically added to the interactions already taking place among the computing devices 500a-c, the processors 550 of each of the computing device 500b providing the host service 949 and the computing device 500d receive each other's signals in an exchange of signals by which one initially discovers the presence of the other and announces itself to the other. Following becoming aware of each other, confirmation that the computing device 500d is an accepted computing device, and confirmation that adding the computing device 500d to the network 1000 is contextually appropriate, the processor circuit 550 of the computing device 500d operates its interface 590 to signal the computing device 500b with what resources it is able to make available and/or what resources it is requesting (perhaps in response to being signaled by the computing device 500b with a request for that information). Upon receipt of that information, the processor 550 of the computing device 500*b* signals a request to the computing device 500*a* providing the directory service to update the configuration data 943 with a new allocation of resources that now includes all four of the computing devices 500*a-d*. The processor circuit 550 of the computing device 500*a* does so, and then operates its interface 590 to transmit the updated version of the configuration data 943 to each of the computing devices 500*b-d*. It may be that as a result, each of the computing devices 500*a-c* are able to access the printer 570 of the computing device 500*d*, and the computing device 500*d* is able to access the resources previously described as made available by each of the computing devices 500*a-c*.

However, where there is no indication in any context data making it appropriate to automatically add the computing device 500*d* to the interactions already taking place among the computing devices 500*a-c*, action may be required on the part of the person associated with the computing device 500*d* and/or persons associated with one or more of the computing devices 500*a-c* to do so, manually. It may be that the processor circuits 550 of one or both of the computing devices 500*d* and 500*b* are caused to cooperate to add the computing device 500*d* to the interactions among the computing devices 500*a-c* only in response to receiving a signal (possibly from one of these computing devices to the other and/or from a user input component of one or both of these computing devices) conveying a command to do so.

Returning to the earlier example of employees of a corporation meeting at a sandwich shop, the employee associated with the computing device 500*d*, despite not being a scheduled participant in the meeting, comes to the sandwich simply to eat lunch. While there, one of the persons associated with one of the computing device 500*a-c* notices the presence of the employee associated with the computing device 500*d* and realizes that the computing device 500*d* has the printer 570, which would be of some use to those participating in the meeting. The person associated with the computing device 500*d* is invited to join the meeting, but as a result of never being scheduled to participate in it, the context data 542*d* does not include information indicating that an appropriate context for the computing device 500*d* exists to be added to the interactions underway among the computing devices 500*a-c*. Thus, none of the processor circuits 550 are caused to automatically act to cause the computing device 500*d* to be so added, and instead, user input into one or more of the computing devices 500*a-d* is required to cause the computing device 500*d* to be included in the interactions among the computing devices 500*a-c* to make the printer 570 of the computing device 500*d* an available resource for use by the computing devices 500*a-c*.

FIG. 3 illustrates a block diagram of aspects of partially and fully discontinuing such interactions as have been described above in considerable detail among the computing devices 500*a-d*. At a time following the start of such interactions between the computing devices 500*a-c*, and then the addition of the computing device 500*d* to those interactions, the computing device 500*b* drops out of the network 1000, as depicted.

With the computing device 500*b* having been assigned to provide the host service 949, the loss of the computing device 500*b* results in the loss of that host service supporting these interactions. However, as previously discussed, the computing device 500*c* had been assigned to serve as a backup provider of the host service 949. In response to detecting that the computing device providing the host service 949 has been lost, the processor 550 of the computing device 500*c* is caused by its control routine 545 to operate the interface 590 to take over providing the host service 949. As part of beginning to provide the host service 949, the processor 550 of the computing device 500*c* is caused to operate its interface 590 to signal the computing device 500*a* providing the directory service to select a computing device to be designated as the new backup for providing the host service 949, update the configuration data 943 to reflect resulting changes in the allocation of resources and provision of network services, and transmit the updated version of the configuration data 943 to the computing devices 500*c-d*. As depicted, the computing device 500*d* is assigned to become that backup for the provision of the host service 949 (as indicated by dotted lines).

At a still later time, these interactions among the computing devices 500*a* and 500*c-d* are discontinued. This may occur automatically in response to the context defined as appropriate for these interactions (in support of the meeting) ceasing to exist, perhaps as a result of the coming of the time at which the meeting was scheduled to end. Alternatively, this may occur in response to the one of the computing devices currently providing the host service (e.g., the computing device 500*c*, following the loss of the computing device 500*b*) being signaled (perhaps as a result of operation of a user input component) with a command to end these interactions.

Throughout operation of the network 1000, the processor circuits 550 of each of the computing devices 500*a-d* have been caused by their respective ones of the control routine 545 to generate corresponding separate versions of rating data 944*a-d* comprised of one or more indications of the degree of functionality of one or more aspects of these interactions from the different perspectives of each of the computing devices 500*a-d*, respectively. Such aspects include, without limitation, response times to queries, data throughput rates, quality of signal, proportion of the time that the network 1000 has been accessible to each of these computing devices, etc. The configuration data 943 is maintained within the storages 560 of each the computing devices 500*a-d* as a record of the configuration of allocation of resources and provisioning of network services for possible use at a future time in re-establishing interactions in the future among these same computing devices (or a relatively similar combination of these computing devices). The separate ones of the rating data 944*a-d* is also maintained in corresponding ones of the storages 560 for use in determining at a future time whether re-establishing the configuration of allocations of resources and provisioning of network services described in the configuration data 943 should be done or should be avoided.

By way of example, as has been discussed, the computing device 500*b* was initially assigned to provide the host service 949, and then the computing device 500*d* was later assigned to do so when the computing device 500*b* dropped out. It may be that one or more of the rating data 943*a-d* shows that one of the computing devices 500*b* and 500*d* was far more effective at providing the host service 949 than the other. It may be that one was more responsive and/or caused the interactions among the computing devices to be trouble-free for a greater proportion of the time, etc. With the benefit of having one or more of such rating data 943*a-d* at a future time when the same or a similar configuration of resource allocation and network services provisioning is again needed, the assignment of providing the host service 949 to the one of the computing devices 500*b* and 500*d* that was previously more effective at providing the host service 949 may at least be made the default assignment for when that particular computing device is available.

Returning to the earlier example of employees of a corporation attending a scheduled meeting at a sandwich shop, as the time originally scheduled for the meeting to end approaches, the processor circuit 550 of one or more of the computing devices 500*a-d* may provide a visual or other form of prompt to at least one of those attending to the effect that the time scheduled for the meeting to end is approaching, and requesting an indication as to whether the continuing interactions to allocate resources and provide network services should be discontinued at that time. The response received by whichever ones of the computing devices 500*a-d* are still present at that time from one or more of the employees may be an indication to proceed with discontinuing such interactions or may be an indication not to so discontinue, just yet, thus causing those interactions to continue past the time at which the meeting was scheduled to end. The processor circuit 550 of one or more of the still present ones of the computing devices 500*a-d* may cause further prompts to be presented to the remaining attendees as time continues, or these processor circuits 550 may be caused to await an indication from one or more remaining attendees that the meeting has ended and/or that such interactions should now be discontinued. Alternatively or additionally, such an indication may be inferred from occurrences of more of the remaining ones of the computing devices 500*a-d* being powered down, placed in some form of "sleep mode" or simply dropping out of the network 1000 without warning.

Figure 4:
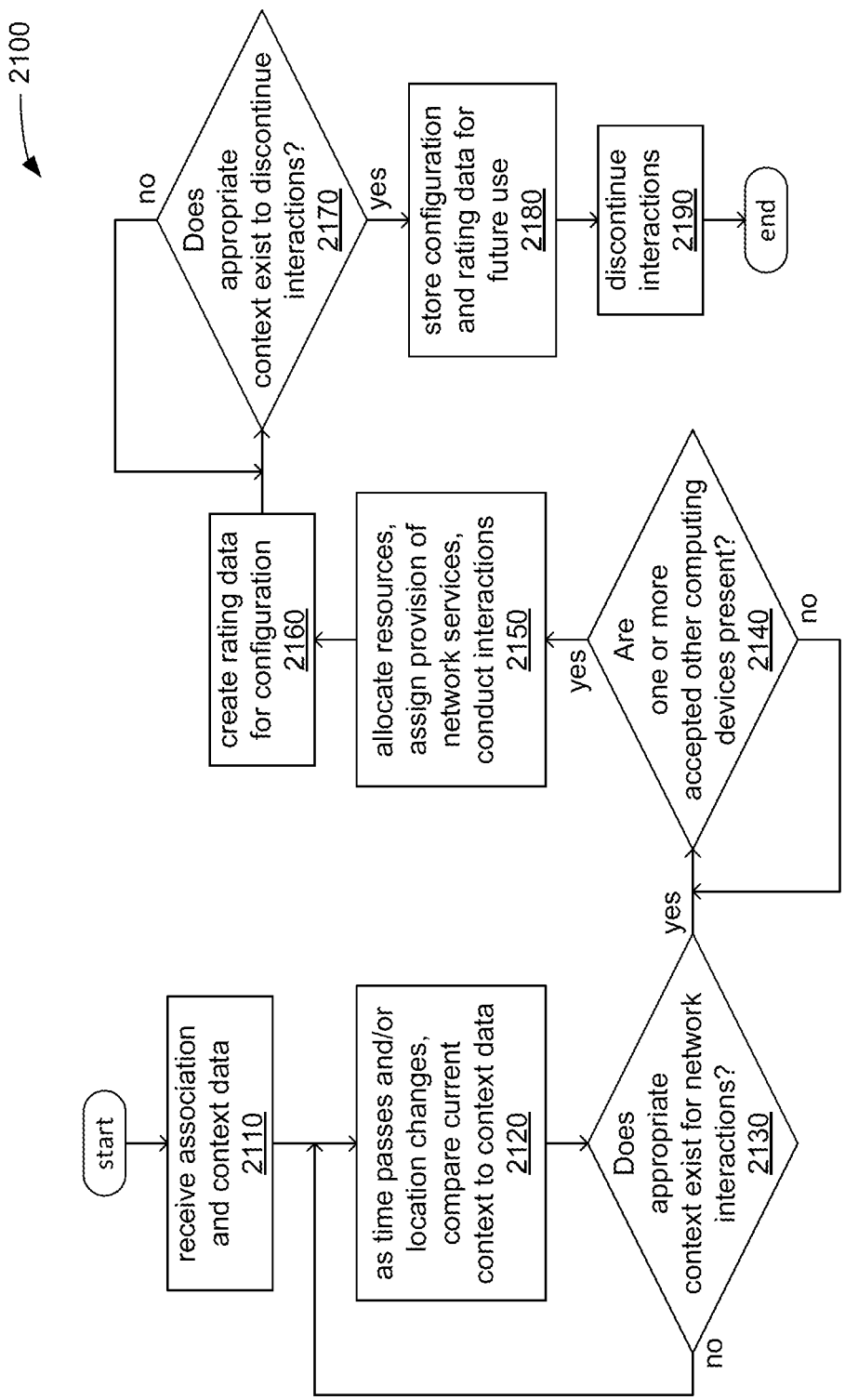
FIG. 4 illustrates an embodiment of a first logic flow.

FIG. 4 illustrates one embodiment of a logic flow 2100. The logic flow 2100 may be representative of some or all of the operations executed by one or more embodiments described herein. More specifically, the logic flow 2100 may illustrate operations performed by the processing circuit 550 of one or more of the computing devices 500*a-d* in executing corresponding ones of the control routine 545.

At 2110, a computing device (e.g., one of the computing devices 500*a-d*) receives association and context data. As previously discussed, this context data may be conveyed to a computing device from a server (e.g., the server 100), or may be provided by a user of the computing device without involvement of a server, or may be a combination of such data provided by both a server and a user of the computing device (perhaps with the data provided by a user of the device overriding what is received from a server, or vice versa).

At 2120, a check is made of the current time and/or the current location of the computing device against the context data for a definition of a context that is appropriate for engaging in interactions with other computing devices to share resources and/or provide network services. If, at 2130, such an appropriate context does not yet exist, then the check for such a context at is again made at 2120.

However, if at 2130, such a context defined as appropriate has arisen such that it now exists, then a check is made at 2140 for the presence of one or more computing devices determined to be accepted computing devices with which to engage in such interactions. As previously discussed, such a check may comprise checking an identifier of one or more computing devices found in local proximity with information identifying accepted computing devices in the association data. Once one or more accepted computing devices are found within local proximity, such interactions are commenced at 2150, including allocation of resources and assignment of the provisioning of network services.

In allocating resources and assigning the provision of network services, configuration data concerning the allocations and assignments is created and distributed among the computing devices by whichever one of the computing devices is assigned to provide the directory service, and this information is caused to be updated by whichever one of the computing devices is assigned to provide the host service. Also, while the network is in operation, at 2160, a rating data comprising one or more ratings of aspects of the network is created.

At 2170, a check is made of the current time and/or the current location of the computing device against the context data for the context having changed such that an appropriate context now exists to discontinue the interactions with the other computing devices. If, at 2170, such an appropriate context has not yet arisen (such that it does not yet exist), then the check for such a context at 2170 is repeated. Alternatively, as previously discussed, one or more of the persons associated with the computing devices then within the network may be prompted to signal (i.e., respond with their input) whether or not the interactions should yet be discontinued.

If at 2170, such an appropriate context has arisen (and/or perhaps, one or more of the persons associated with the computing devices then within the network signals their ascent to discontinue the interactions), then at 2180, configuration data and the rating data are stored by each of the computing devices then still engaged in the interactions for future use in possibly re-establishing interactions among the same (or similar) group of computing devices at a future time. The interactions are then discontinued at 2190.

Figure 5:
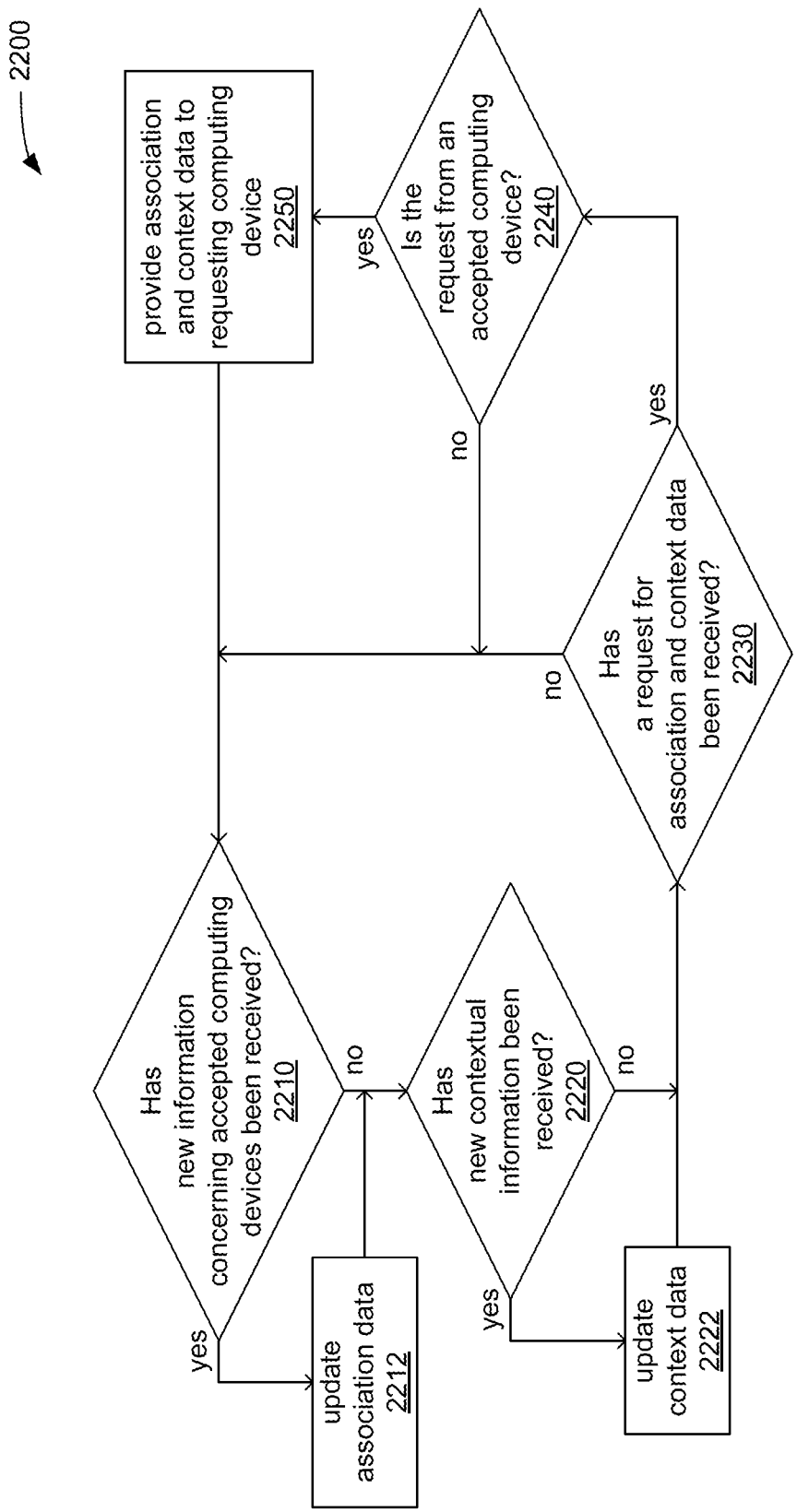
FIG. 5 illustrates an embodiment of a second logic flow.

FIG. 5 illustrates one embodiment of a logic flow 2200. The logic flow 2200 may be representative of some or all of the operations executed by one or more embodiments described herein. More specifically, the logic flow 2200 may illustrate operations performed by the processing circuit 150 of the server 100 in executing the control routine 145.

At 2210, a server (e.g., the server 100) makes a check for any new information concerning accepted computing devices (e.g., new computing devices being added to the ones deemed accepted as participants in forming a local network, any computing devices being removed from the ones that are so accepted, etc.) being received. If such new information has been received, then an association data maintained by the server is updated at 2212 to reflect such new information. Where updating the association information entails adding a new computing device, then the server may generate a new unique identifier for that computing device, which will be given to that computing device and used in adding that computing device to lists of accepted computing devices given to other computing devices.

At 2220, a check is made for any new contextual information (e.g., new, changed or canceled meetings; changes to business units, projects or groups that a person is associated with; changes to places of interest to a group and/or individuals of that group; changes to aspects of a relationship between people affecting contexts under which they may wish interact; etc.) being received. If such new information has been received, then a context data maintained by the server is updated at 2222 to reflect such new information.

At 2230, a check is made for any requests to provide the association and context data to a computing device. If such a request has not been received, then a check is again made at 2210 for the receipt of new information concerning the association data. However, if such a request has been received, then a check is made at 2240 as to whether the computing device making the request is an accepted computing device. If the requesting computing device is an accepted computing device, then the request is satisfied at 2250 with the transmission of the association and context data by the server 100 to the requesting computing device. However, if at 2240, the requesting computing device is not an accepted computing device, then the request is ignored and a check is again made at 2210 for the receipt of new information concerning the association data.

Figure 6:
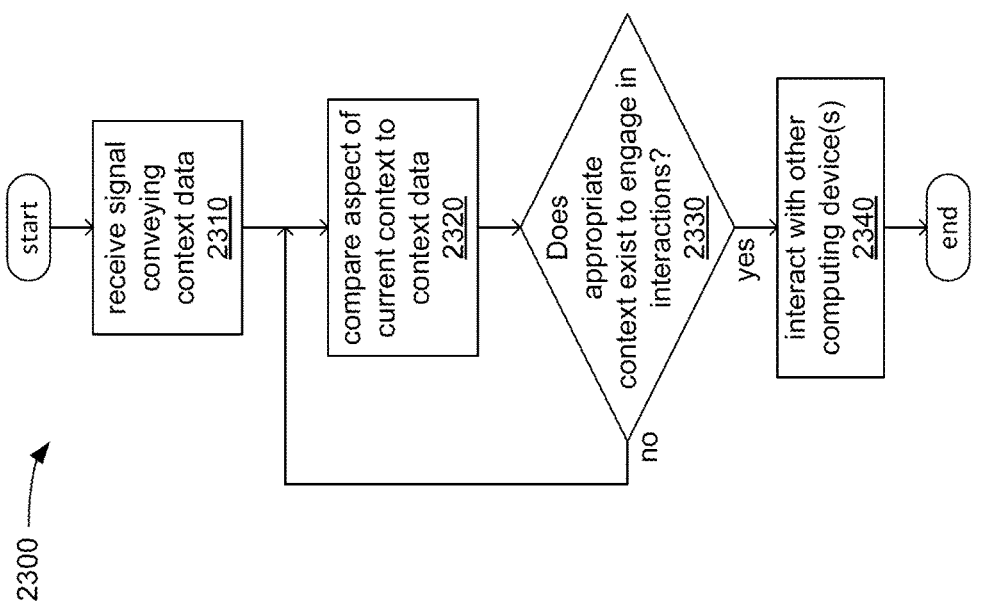
FIG. 6 illustrates an embodiment of a third logic flow.

FIG. 6 illustrates one embodiment of a logic flow 2300. The logic flow 2300 may be representative of some or all of the operations executed by one or more embodiments described herein. More specifically, the logic flow 2300 may illustrate operations performed by the processing circuit 550 of one or more of the computing devices 500a-d in executing corresponding ones of the control routine 545.

At 2310, at least one component of a computing device (e.g., the processor circuit 550 of one of the computing devices 500a-d) receives a signal conveying a context data to the computing device. As previously discussed, such a signal may originate from a server (e.g., the server 100) providing these pieces of data, or may originate from a manually-operable control of the computing device being operated by its user to manually provide one or both of these pieces of data.

At 2320, an aspect of the current context (e.g., time, location, proximity of other devices, etc.) of the computing device is compared to an aspect of the context data to determine whether an appropriate context now exists to engage in interactions with one or more other computing devices (e.g., one or more others of the computing devices 500a-d). At 2330, if it is determined that no such context defined as appropriate yet exists to engage in such interactions, then the comparison at 2320 is repeated.

However, if at 2330, it is determined that an appropriate context now does exist to engage in such interactions, then the at least one component of the computing device commences engaging in such interactions, at 2340. Such interactions comprising at least one of sharing a resource with the one or more other computing devices and providing a network service to the one or more other computing devices.

Figure 7:
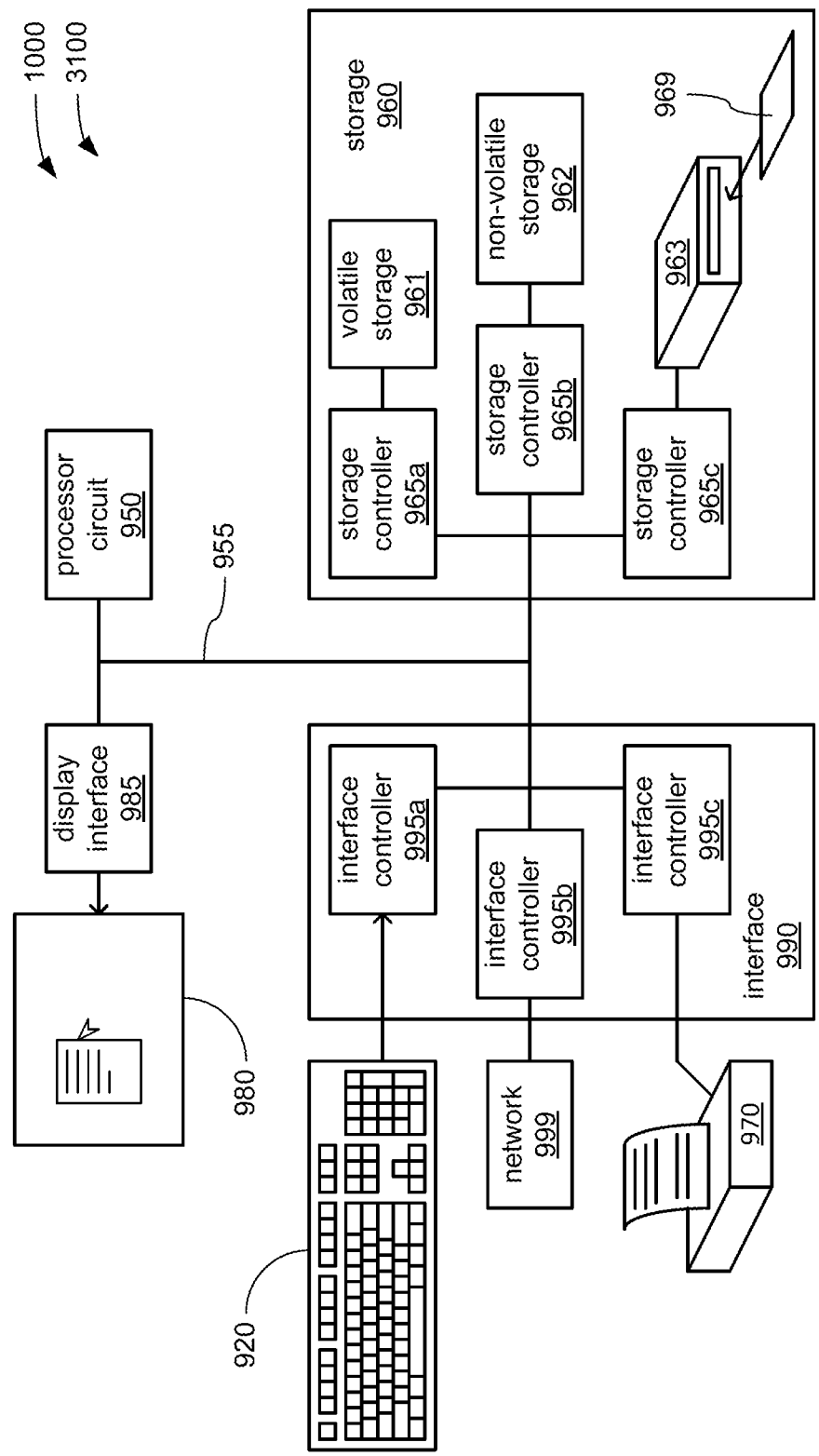
FIG. 7 illustrates an embodiment of a processing architecture.

FIG. 7 illustrates an embodiment of an exemplary processing architecture 3100 suitable for implementing various embodiments as previously described. More specifically, the processing architecture 3100 (or variants thereof) may be implemented as part of one or more of the computing devices 100, 300 and 500a-d. It should be noted that components of the processing architecture 3100 are given reference numbers in which the last two digits correspond to the last two digits of reference numbers of components earlier depicted and described as part of each of the computing devices 100, 300 and 500a-d. This is done as an aid to correlating such components of whichever ones of the computing devices 100, 300 and 500a-d may employ this exemplary processing architecture in various embodiments.

The processing architecture 3100 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor circuit, the processor circuit itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). For example, both an application running on a server and the server itself can be components. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For example, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3100, a computing device comprises at least a processor circuit 950, a storage 960, an interface 990 to other devices, and coupling 955. As will be explained, depending on various aspects of a computing device implementing the processing architecture 3100, including its intended use and/or conditions of use, such a computing device may further comprise additional components, such as without limitation, a display interface 985.

Coupling 955 is comprised of one or more buses, transceivers, buffers, crosspoint switches, and/or other conductors and/or logic that communicatively couples at least the processor circuit 950 to the storage 960. Coupling 955 may further couple the processor circuit 950 to one or more of the interface 990 and the display interface 985 (depending on which of these and/or other components are also present). With the processor circuit 950 being so coupled by couplings 955, the processor circuit 950 is able to perform the various ones of the tasks described at length, above, for whichever ones of the computing devices 100, 300 and 500a-d implement the processing architecture 3100. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor circuit 950 (corresponding to one or more of the processor circuits 150, 350 and 550) may comprise any of a wide variety of commercially available processors, employing any of a wide variety of technologies and implemented with one or more cores physically combined in any of a number of ways.

As previously discussed, the storage 960 (corresponding to one or more of the storages 160, 360 and 560) may comprise one or more distinct storage devices based on any of a wide variety of technologies or combinations of technologies. More specifically, as depicted, the storage 960 may comprise one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor circuit 950 (but possibly using a "volatile" technology constantly requiring electric power) while another type provides a relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and comprises one or more ferromagnetic and/or solid-state disk drives, the non-volatile storage 962 may be communicatively coupled to coupling 955 through a storage controller 965*b* providing an appropriate interface to the non-volatile storage 962 that perhaps employs addressing of blocks of information and/or of cylinders and sectors. By way of still another example, where the removable media storage 963 (corresponding to the removable media storage 563 of the computing device 500*a*) is present and comprises one or more optical and/or solid-state disk drives employing one or more pieces of machine-readable storage media 969, the removable media storage 963 may be communicatively coupled to coupling 955 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage media 969.

One or the other of the volatile storage 961 or the non-volatile storage 962 may comprise an article of manufacture in the form of a machine-readable storage media on which a routine comprising a sequence of instructions executable by the processor circuit 960 may be stored, depending on the technologies on which each is based. By way of example, where the non-volatile storage 962 comprises ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may comprise banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor circuit 960 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor circuit 960 as that routine is executed.

As previously discussed, the interface 990 (corresponding to one or more of the interfaces 190, 390 and 590) may employ any of a variety of signaling technologies corresponding to any of a variety of communications technologies that may be employed to communicatively couple a computing device to one or more other devices. Again, one or both of various forms of wired or wireless signaling may be employed to enable the processor circuit 950 to interact with input/output devices (e.g., the depicted example keyboard 920 or printer 970) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995*a*, 995*b* and 995*c* (corresponding to the interface controller 595 of the computing device 500*c*). The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (corresponding to the network 1000). The interface 995*c* may employ any of a variety of electrically conductive cabling enabling the use of either serial or parallel signal transmission to convey data to the depicted printer 970 (corresponding to the printer 570 of the computing device 500*d*). Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually comprises) a display (e.g., the depicted example display 980, corresponding to one or both of the displays 180 and 580), such a computing device implementing the processing architecture 3100 may also comprise the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 300 and 500a-d may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed processing architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the scope of the appended claims. The detailed disclosure now turns to providing examples that pertain to further embodiments. The examples provided below are not intended to be limiting.

An example computer-implemented method comprises receiving, at a computing device, a signal conveying a context data; retrieving an aspect of a current context of the computing device; comparing the aspect to the context data; determining whether a context defined as appropriate exists to engage in interactions with one or more other computing devices through a network based on the comparison, the interactions comprising providing a network service to the one or more other computing devices; and engaging in the interactions with one or more computing devices through the network when the appropriate context to engage in the interactions exists.

The above example computer-implemented method, the aspect of the current context comprising a current time, the context data comprising an indication of a scheduled event starting at a particular time, and determining that an appropriate context exists comprising determining that the particular time at which the scheduled event starts has been reached.

Either of the above-examples of computer-implemented method, comprising comparing another current time to an indication of the context data of the scheduled event ending at another particular time to determine whether a context defined as appropriate exists to discontinue the interactions, and discontinuing the interactions when the context to discontinue the interactions exists.

Any of the above examples of computer-implemented method, the aspect of the current context comprising a current location of the computing device, the context data comprising an indication of a particular place being of interest to a person associated with the computing device, and determining that an appropriate context exists comprising determining that the current location of the computing device is at the particular place.

Any of the above examples of computer-implemented method, engaging in interactions comprises allocating the resources among the computing device and the one or more other computing devices, and assigning a network service to be performed by one of the computing device and the one or more other computing devices.

Any of the above examples of computer-implemented method, comprising receiving another signal conveying an association data to the computing device; receiving at least one identifier from the one or more other computing devices; comparing the at least one identifier to the association data, the association data comprising a plurality of identifiers uniquely identifying each of multiple accepted computing devices; determining whether one of the one or more other computing devices is an accepted computing device with which to engage in the interactions based on the comparison of identifiers; and engaging in the interactions with the one of the one or more computing devices through the network in response to determining that the one of the one or more other computing devices is an accepted computing device.

Any of the above examples of computer-implemented method, comprising sharing a resource of the computing device through the network with the one or more other computing devices.

Any of the above examples of computer-implemented method, the resource comprising space within a storage of the computing device.

Any of the above examples of computer-implemented method, providing a network service to the one or more other computing devices comprising providing one of a directory service, a host service, an email relay service, and a file transfer service through the network.

Any of the above examples of computer-implemented method, comprising comparing an aspect of a current context to the context data to determine whether a context defined as appropriate exists to discontinue the interactions; and discontinuing the interactions when the context to discontinue the interactions exists.

Any of the above examples of computer-implemented method, comprising transmitting a signal to one of the one or more other computing devices through the network, the signal conveying a command to discontinue interactions.

An example apparatus comprises a processor circuit and a storage communicatively coupled to the processor circuit and storing a sequence of instructions that when executed by the processor circuit, causes the processor circuit to: receive a signal conveying a context data; retrieve an aspect of a current context of the apparatus; compare the aspect to the context data; determine whether a context defined as appropriate exists to engage in interactions with one or more other computing devices through a network based on the comparison, the interactions comprising providing a network service to the one or more other computing devices; and engage in the interactions with one or more computing devices through the network when the appropriate context to engage in the interactions exists.

The above example apparatus, the aspect of the current context comprising a current time, the context data comprising an indication of a scheduled event starting at a particular time, and determining that an appropriate context exists comprising determining that the particular time at which the scheduled event starts has been reached.

Either of the above examples of apparatus, the processor circuit caused to compare another current time to an indication of the context data of the scheduled event ending at another particular time to determine whether a context defined as appropriate exists to discontinue the interactions; and discontinue the interactions when the context to discontinue the interactions exists.

Any of the above examples of apparatus, the aspect of the current context comprising a current location of the apparatus, the context data comprising an indication of a particular place being of interest to a person associated with the apparatus, and determining that an appropriate context exists comprising determining that the current location of the apparatus is at the particular place.

Any of the above examples of apparatus, comprising an interface operative to receive global positioning satellite signals to enable the processor circuit to determine the current location.

Any of the above examples of apparatus, the processor circuit caused to: receive another signal conveying an association data to the apparatus; receive at least one identifier from the one or more other computing devices; compare the at least one identifier to the association data, the association data comprising a plurality of identifiers uniquely identifying each of multiple accepted computing devices; determine whether one of the one or more other computing devices is an accepted computing device with which to engage in the interactions based on the comparison of identifiers; and engaging in the interactions with the one of the one or more computing devices through the network in response to determining that the one of the one or more other computing devices is an accepted computing device.

Any of the above examples of apparatus, the processor circuit caused to share a resource of the apparatus across the network with the one or more other computing devices.

Any of the above examples of apparatus, the resource comprising space within the storage.

Any of the above examples of apparatus, providing a network service to the one or more other computing devices comprising providing one of a directory service, a host service, an email relay service, and a file transfer service through the network.

Any of the above examples of apparatus, the processor circuit caused to compare an aspect of a current context to the context data to determine whether a context defined as appropriate exists to discontinue the interactions; and discontinue the interactions when the context to discontinue the interactions exists.

Any of the above examples of apparatus, the processor circuit caused to transmit a signal to one of the one or more other computing devices through the network, the signal conveying a command to discontinue interactions.

An example of at least one machine-readable storage medium comprising a plurality of instructions that when executed by a computing device, causes the computing device to: receive a signal conveying a context data; retrieve an aspect of a current context of the computing device; compare the aspect to the context data; determine whether a context defined as appropriate exists to engage in interactions with one or more other computing devices through a network based on the comparison, the interactions comprising providing a network service to the one or more other computing devices; and engage in the interactions with one or more computing devices through the network when the appropriate context to engage in the interactions exists.

The above example of at least one machine-readable storage medium, the aspect of the current context comprising a current time, the context data comprising an indication of a scheduled event starting at a particular time, and determining that an appropriate context exists comprising determining that the particular time at which the scheduled event starts has been reached.

Either of the above examples of at least one machine-readable storage medium, the computing device caused to: receive another signal conveying an association data to the computing device; receive at least one identifier from the one or more other computing devices; compare the at least one identifier to the association data, the association data comprising a plurality of identifiers uniquely identifying each of multiple accepted computing devices; determine whether one of the one or more other computing devices is an accepted computing device with which to engage in the interactions based on the comparison of identifiers; and engaging in the interactions with the one of the one or more computing devices through the network in response to determining that the one of the one or more other computing devices is an accepted computing device.

Any of the above examples of at least one machine-readable storage medium, the computing device caused to compare an aspect of a current context to the context data to determine whether a context defined as appropriate exists to discontinue the interactions; and discontinue the interactions when the context to discontinue the interactions exists.

Another example computer-implemented method comprising: transmitting a signal to a first computing device conveying a first association data and a first context data, the first association data comprising an identifier of a second computing device to enable the first computing device to recognize the second computing device as an accepted computing device, the first context data comprising an indication of an event to be attended by a first person associated with the first computing device and a second person associated with the second computing device to define an appropriate context for the first computing device to engage in interactions with the second computing device through a network as comprising a time at which the event starts; and transmitting a signal to a second computing device conveying a second association data and a second context data, the second association data comprising an identifier of the first computing device to enable the second computing device to recognize the first computing device as an accepted computing device, the second context data comprising an indication of the event to define an appropriate context for the second computing device to engage in interactions with the first computing device through the network comprising the time at which the event starts.

The above other example computer-implemented method, the indication of the event of the first context data defining an appropriate context for the first computing device to discontinue the interactions with the second computing device comprising a time at which the event ends.

Either of the above other examples of computer-implemented method, comprising randomly generating the identifier of the first computing device in response to receiving an indication to add the first computing device to a third association data from which the first association data and the second association data are derived; and adding the identifier of the first computing device to the third association data.

The invention claimed is:

1. An apparatus comprising:
   a processor circuit;
   an interface to communicatively couple the processor circuit to a network; and
   a storage communicatively coupled to the processor circuit and storing a sequence of instructions that when executed by the processor circuit, causes the processor circuit to:
      operate the interface to receive context data of a scheduled event and an association data comprising identifiers that each uniquely identify a corresponding accepted computing device with which to engage in interactions;
      operate the interface to receive an identifier from a computing device;
      compare the identifier to the association data to determine whether the computing device is an accepted computing device;
      retrieve an aspect of a current context of the apparatus, the aspect of the current context of the apparatus comprising one or more of a current time or a current location of the apparatus;
      in response to a determination that the computing device is an accepted computing device, compare the aspect to the context data to determine whether an appropriate context exists to share resources and exchange provision of network services with the computing device through the network; and
      in response to a determination that the appropriate context exists, engage in the interactions with the computing device through the network, the interactions to comprise receipt of an indication of an available network service and a requested network service from the computing device, provision of the requested network service to the computing device from the apparatus based on the indication, and provision of the available network service to the apparatus from the computing device based on the indication.

2. The apparatus of claim 1, the aspect of the current context comprising a current time, the context data comprising an indication of the scheduled event having a start time, and determining that an appropriate context exists comprising determining that the start time has been reached.

3. The apparatus of claim 2, the processor circuit caused to:
   compare another current time to an indication of the context data of the scheduled event having an end time to determine whether a context defined as appropriate exists to discontinue the interactions; and
   operate the interface to discontinue the interactions when the context to discontinue the interactions exists.

4. The apparatus of claim 1, the aspect of the current context comprising a current location of the apparatus, the context data comprising an indication of a particular place being of interest to a person associated with the apparatus, and determining that an appropriate context exists comprising determining that the current location of the apparatus is at the particular place.

5. The apparatus of claim 4, the interface is operative to receive global positioning satellite signals to enable the processor circuit to operate the interface to determine the current location.

6. The apparatus of claim 1, the processor circuit caused to operate the interface to share a resource of the apparatus across the network with the computing device as the network service.

7. The apparatus of claim 6, the resource comprising space within the storage.

8. The apparatus of claim 1, provision of the requested network service to the computing device comprising operating the interface to provide one of a directory service, a host service, an email relay service, and a file transfer service through the network.

9. The apparatus of claim 1, the processor circuit caused to:
   compare another aspect of the current context to the context data to determine whether a context defined as appropriate exists to discontinue the interactions; and
   operate the interface to discontinue the interactions when the context to discontinue the interactions exists.

10. The apparatus of claim 9, the processor circuit caused to operate the interface to transmit a signal to one of one or more other computing devices through the network, the signal conveying a command to discontinue interactions.

11. A computer-implemented method comprising:
    receiving, at a computing device, context data of a scheduled event and an association data comprising identifiers that each uniquely identify a corresponding accepted computing device with which to engage in interactions;
    receiving, at the computing device, an identifier from another computing device;

comparing the identifier to the association data to determine whether the other computing device is an accepted computing device;

retrieving an aspect of a current context of the computing device, the aspect of the current context of the computing device comprising one or more of a current time or a current location of the computing device;

in response to a determination that the other computing device is an accepted computing device, comparing the aspect to the context data to determine whether an appropriate context exists to share resources and exchange provision of network services with the other computing device through a network; and in response to a determination that the appropriate context exists, engaging in the interactions with the other computing device through the network, the interactions comprising receiving, at the computing device, an indication of an available network service and a requested network service from the other computing device, provisioning of the requested network service to the other computing device from the computing device based on the indication, and provisioning of the available network service to the computing device from the other computing device based on the indication.

12. The computer-implemented method of claim 11, the aspect of the current context comprising a current time, the context data comprising an indication of the scheduled event having a start time, and determining that an appropriate context exists comprising determining that the start time has been reached.

13. The computer-implemented method of claim 12, comprising:

comparing another current time to an indication of the context data of the scheduled event having an end time to determine whether a context defined as appropriate exists to discontinue the interactions; and discontinuing the interactions when the context to discontinue the interactions exists.

14. The computer-implemented method of claim 11, the aspect of the current context comprising a current location of the computing device, the context data comprising an indication of a particular place being of interest to a person associated with the computing device, and determining that an appropriate context exists comprising determining that the current location of the computing device is at the particular place.

15. The computer-implemented method of claim 11, engaging in interactions comprises allocating resources of the computing device among the computing device and the other computing device, and assigning a network service to be performed by one of the computing device and the other computing device.

16. The computer-implemented method of claim 11, comprising providing a network service to the other computing device.

17. The computer-implemented method of claim 16, providing a network service to the other computing device comprising providing one of a directory service, a host service, an email relay service, and a file transfer service through the network.

18. The computer-implemented method of claim 11, the resource comprising space within a storage of the computing device.

19. The computer-implemented method of claim 11, comprising:

comparing another aspect of the current context to the context data to determine whether a context defined as appropriate exists to discontinue the interactions; and discontinuing the interactions when the context to discontinue the interactions exists.

20. The computer-implemented method of claim 19, comprising transmitting a signal to one of the other computing device through the network, the signal conveying a command to discontinue interactions.

21. At least one non-transitory machine-readable storage medium comprising a plurality of instructions that when executed by a computing device, causes the computing device to:

receive context data of a scheduled event and an association data comprising identifiers that each uniquely identify a corresponding accepted computing device with which to engage in interactions;

receive, at the computing device an identifier from another computing device;

compare the identifier to the association data to determine whether the other computing device is an accepted computing device;

retrieve an aspect of a current context of the computing device, the aspect of the current context of the computing device comprising one or more of a current time or a current location of the computing device;

in response to a determination that the other computing device is an accepted computing device, compare the aspect to the context data to determine whether an appropriate context exists to share resources and exchange provision of network services with the other computing device through a network; and in response to a determination that the appropriate context exists, engaging in the interactions with the other computing device through the network, the interactions to comprise receipt of an indication of an available network service and a requested network service from the other computing device, provision of the requested network service to the other computing device from the computing device based on the indication, and provision of the available network service to the computing device from the other computing device based on the indication.

22. The at least one non-transitory machine-readable storage medium of claim 21, the aspect of the current context comprising a current time, the context data comprising an indication of the scheduled event having a start time, and determining that an appropriate context exists comprising determining that the start time has been reached.

23. The at least one non-transitory machine-readable storage medium of claim 21, the computing device caused to:

compare another aspect of the current context to the context data to determine whether a context defined as appropriate exists to discontinue the interactions; and discontinue the interactions when the context to discontinue the interactions exists.

* * * * *